2,842,549

PYRIDYLETHYLTHIOMERCURIC SALTS AND METHOD FOR THEIR PREPARATION

Lyle D. Goodhue and Rector P. Louthan, Bartlesville, Okla., assignors to Phillips Petroleum Company, a corporation of Delaware No Drawing. Application October 17, 1955
Serial No. 541,035

17 Claims. (Cl. 260—270)

This invention relates to pyridylethylthiomercuric salts and a method for their preparation. In one aspect this invention relates to pyridylethylthiomercuric salts as new compounds. In another aspect this invention relates to a method for the preparation of pyridylethylthiomercuric salts.

According to the invention there are provided as new compounds pyridylethylthiomercuric salts characterized by the following structural formula

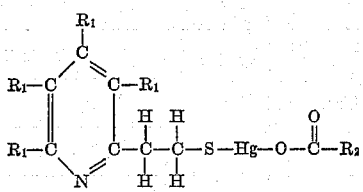

wherein: each $R_1$ is selected from the group consisting of a hydrogen atom, a methyl radical, an ethyl radical, a propyl radical and an isopropyl radical; and $R_2$ is selected from the group consisting of —$CH_3$, —$CH_2H_5$,

and

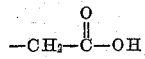

radicals.

Further, according to the invention there is provided a method for the preparation of said new pyridylethylthiomercuric salts which comprises reacting a 2-mercaptoethylpyridine with a mercuric salt of an aliphatic carboxylic acid containing not more than 3 carbon atoms.

An object of the invention is to provide a new class of organic compounds, i. e., pyridylethylthiomercuric salts characterized by the above described structural formula. Another object is to provide a method of preparation for said new class of organic compounds. Other aspects, objects, and advantages of the invention will be apparent to those skilled in the art upon reading the accompanying disclosure.

One method for the preparation of the compounds of the invention comprises reacting 2-mercaptoethylpyridine, or an alkyl substituted 2-mercaptoethylpyridine, with a mercuric salt of an aliphatic mono- or dicarboxylic acid containing three or less carbon atoms. Herein and in the claims the term "an alkyl substituted 2-mercaptoethylpyridine" refers to a 2-mercaptoethylpyridine wherein at least one hydrogen atom attached to a carbon atom of the pyridine nucleus has been substituted by a hydrocarbon radical selected from the group consisting of methyl, ethyl, propyl, and isopropyl radicals. Representative mercaptoethylpyridines which can be used in the method of the invention include, among others, the following: 2-mercaptoethylpyridine, 5-methyl-2-mercaptoethylpyridine, 5-ethyl-2-mercaptoethylpyridine, 3,4,5-triethyl-2-mercaptoethylpyridine, 6-propyl-2-mercaptoethylpyridine, 5,6-diisopropyl-2-mercaptoethylpyridine, and 3,4,5,6-tetramethyl-2-mercaptoethylpyridine.

Preparation of the above named mercaptoethylpyridines is known in the art. One method comprises reacting the appropriate 2-vinylpyridine with an excess of hydrogen sulfide, either in the presence or absence of a suitable catalyst. While the reaction proceeds satisfactorily in the absence of a catalyst a small amount of piperidine causes the reaction to proceed at a faster rate. Another method for the preparation of the said mercaptoethylpyridines comprises reacting 2-vinylpyridine, or an alkyl substituted 2-vinylpyridine with carbothiolic acid at a temperature below 50° C. and then hydrolyzing the resulting 2-[beta-(acylthio)-ethyl]pyridine with methyl alcohol in the presence of an acid to obtain the corresponding 2-mercaptoethylpyridine. Further details regarding the latter method of preparation can be found in U. S. Patent 2,607,776.

Suitable mercuric salts which can be used in the method of the invention include, among others, the following: mercuric acetate, mercuric formate, mercuric propionate, mercuric oxalate, and mercuric malonate.

The particular 2-mercaptoethylpyridines and mercuric salts to be used in the method of the invention will be determined by the pyridylethylthiomercuric salt which it is desired to prepare as will be understood by those skilled in the art. Included among the compounds which can be prepared according to the method of the invention, and which are representative of the novel compounds of the invention, are the following: 2(2-pyridyl)ethylthiomercuric acetate, 2-[2-(5-methylpyridyl)]ethylthiomercuric acetate, 2-[2-(4,5-diethylpyridyl)]ethylthiomercuric acetate, 2-[2-(5-ethylpyridyl)]ethylthiomercuric acetate, 2-[3,4,5-tripropylpyridyl)]ethylthiomercuric acetate, 2-[2-(6-isopropylpyridyl)]ethylthiomercuric acetate, 2-(2-pyridyl)ethylthiomercuric propionate, 2-[2-(5-methylpyridyl)]ethylthiomercuric propionate, 2-[2-(5-methylpyridyl)]ethylthiomercuric formate, 2-[2-(3,4,5-triisopropylpyridyl)]ethylthiomercuric oxalate, and 2-[2-(4-n-propylpyridyl)]ethylthiomercuric malonate.

If desired the reaction involved in the method of the invention can be carried out in the presence of a suitable organic solvent. Any solvent which is non-reactive with the reactants being used or the product being prepared, i. e., which is inert under the reaction conditions, is a suitable solvent. Examples of suitable solvents are: methyl alcohol, ethyl alcohol ethylene diamine, propylene diamine and ethylene glycol. Hot water can also be used. The solvent can be added separately to the reaction mixture and either or both of the reactants can enter the reaction zone along with the solvent.

In one method for the preparation of the compounds of the invention a solution of the 2-mercaptoethylpyridine to be used is prepared by dissolving said 2-mercaptoethylpyridine in methyl alcohol. A solution of the chosen mercuric salt of an aliphatic mono- or dicarboxylic acid dissolved in methyl alcohol is also prepared. The two solutions are then mixed and a volume of water approximately equal to the volume of the mixture is then added to said mixture. Although not essential, the resulting mixture is then preferably heated to the boiling point and a resonable time is allowed for substantially complete precipitation of the pyridylethylthiomercuric salt which is then recovered from the mother liquor, washed with methyl alcohol, and then dried.

The following example further illustrates one method of preparing the compounds of the invention.

Example 1

11.8 grams of 2-mercaptoethylpyridine was dissolved in about 50 cc. of methyl alcohol and added to a solution of 13.3 grams of mercuric acetate in 50 cc. of methyl alcohol. There were no signs of precipitation, but the solution became dark. An additional 13.3 grams of mercuric acetate was then added, but there were still no signs of a precipitate. About 77 cc. of water was then added which resulted in a clearing of the solution, but did not cause the formation of a precipitate. The solution was then heated to boiling, and white crystals began to form. The mixture was then allowed to stand in a refrigerator over a period of about two days, after which the precipitate which had formed was filtered out. The crystals which were filtered out were washed with methyl alcohol and dried in a vacuum oven overnight. The dried product amounted to 19.2 grams, representing a yield of 57 percent of theoretical. The melting point of said product was found to be 136–146° C. with decomposition taking place. The analysis of said product was found to be: oxygen 9.6%; nitrogen 2.8%; and mercury 53.9%, by weight.

The above analysis indicates that the structural formula of the prepared compound is

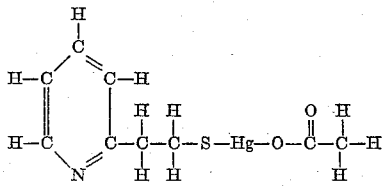

The calculated elemental analysis for the compound of the above structural formula is as follows: oxygen 8.05%; nitrogen 3.52%; and mercury 50.5%, by weight.

The compounds of the invention are useful as bactericides. They are effective in inhibiting the growth of *Micrococcus pyogenes* var. *aureus* and *Escheria coli* bacteria as well as many other organisms of this type. When the compounds of the invention are used as bactericides it is preferred to dissolve them either in acetone or alcohol and then dilute the solution to the concentration desired by the addition of water. The preferred concentration range is from 1 p. p. m. to 1000 p. p. m. of bactericide, but weaker or stronger solutions can be used, depending upon the degree of bactericidal effectiveness desired.

The following example illustrates the use of the compounds of the invention as a bactericide.

*Example II*

Another batch of 2-(2-pyridyl)ethylthiomercuric acetate was prepared in the following manner: A solution of mercuric acetate consisting of 3.33 grams of mercuric acetate dissolved in 100 ccs. of methanol was prepared. To this solution was added 2.94 grams of 2-mercaptoethylpyridine, and the resulting mixture was heated to boiling. One hundred ccs. of water and an additional 3.33 grams of mercuric acetate were then added to the mixture. A white crystalline precipitate was formed, and after precipitation was complete, the precipitate was removed, washed twice with water, and twice with methanol. The white crystalline precipitate was then dried for 30 minutes in an air oven at 150° F. and for 1½ hours in a vacuum oven at 120° F. The calculated yield was 96% of theoretical.

The compound prepared as outlined above was tested for bactericidal properties by the following procedure, a modification of the paper disk assay method used by Hoffman and Phillips of the Biological Department, Chemical Corps, Camp Detrick, Maryland, Ann. N. Y. Acad. Sci. 53, 59–65 (1950).

Several 100 by 25 mm. glass Petri dishes were sterilized and then covered with Brewer aluminum tops. These tops were provided with a paper disk center to prevent moisture from collecting on the top of the dishes. Into each dish there was pipetted 15 cc. of sterile penicillin assay base agar, consisting of 6 grams peptone, 3 grams yeast extract, 1.5 grams beef extract, and 15 grams agar in 1000 ccs. of water. When this agar had hardened, 5 cc. of inoculated penicillin assay seed agar was added. This seed agar was composed of 6 grams peptone, 4 grams of trypticase, 3 grams yeast extract, 1.5 grams beef extract, 1 gram glucose, and 15 grams of agar in 1000 ccs. of water. For use in the separate tests this seed agar had been inoculated with either *Micrococcus pyogenes* var. *aureus* or *Escheria coli* bacteria by adding 0.3 cc. of 48 hour broth cultures of the desired bacteria to 100 ccs. of agar.

When the test media had hardened, a standard penicillin assay disk was placed in the center of each dish. These disks were of a thick porous paper and were exactly 12.5 mms. in diameter. Various concentrations of the 2-(2-pyridyl)ethylthiomercuric acetate in ethyl alcohol were made up by the previously outlined procedure and tested as bactericides by placing 0.07 ccs. of the various concentrations on the different disks.

The cultures were incubated at 37° C. and were read at 24 and 48 hours by holding the plates to a light and measuring the generally circular zone where no bacteria growth had occurred. Since the paper disks were 12.5 mms. in diameter, a zone of 12.5 mms. indicated no inhibition of bacteria growth. The results of these tests are tabulated below:

| Concentration of 2-(2-Pyridyl) ethyl-thiomercuric acetate | Zone of Inhibition (mm.) | | | |
|---|---|---|---|---|
| | S. Aureus | | E. Coli | |
| | 24 hrs. | 48 hrs. | 24 hrs. | 48 hrs. |
| 100 p. p. m | 19.5 | 17 | 18 | 18 |
| 10 p. p. m | 16.0 | 12.5 | 17 | 16 |
| 1 p. p. m | 12.5 | 12.5 | 12.5 | 12.5 |

Two commercial bactericides, tincture of Merthiolate and commercial mercuric chloride solution, were tested by the same procedure as above for comparative results. The tincture of Merthiolate, having a concentration of 1000 p. p. m., caused a zone of inhibition toward *Micrococcus pyogenes* var. *aureus* bacteria which measured 33.5 mms. at the end of 48 hours. Tested in the same manner against *Escheria coli* bacteria, the tincture of Merthiolate caused a zone of inhibition toward this bacteria which measured 20 mms. at the end of 48 hours. Commercial mercuric chloride solution in a concentration of 10,000 p. p. m. was tested in a similar manner, causing zones of inhibition of 47 mms. and 40 mms. for *Micrococcus pyogenes* var. *aureus* and *Escheria coli* bacteria respectively. Similarly, mercuric chloride solution of a concentration of 1,000 p. p. m. caused a zone of inhibition toward the *Micrococcus pyogenes* var. *aureus* of 31 mms. and a zone of 33 mms. toward the *Escheria coli* bacteria.

As will be evident to those skilled in the art, various modifications can be made or followed in the light of the foregoing disclosure without departing from the spirit or scope of the invention.

We claim:

1. A pyridylethylthiomercuric salt characterized by the following structural formula

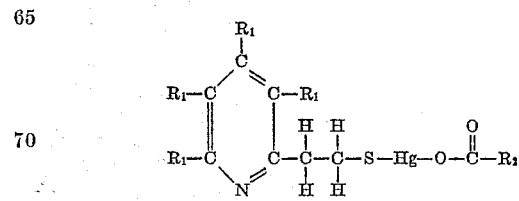

wherein: each $R_1$ is selected from the group consisting of a hydrogen atom, a methyl radical, an ethyl radical, a propyl radical and an isopropyl radical; and $R_2$ is selected from the group consisting of —$CH_3$, —$C_2H_5$, and

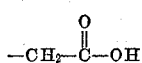

radicals.

2. 2-(2-pyridyl)ethylthiomercuric acetate.
3. 2-[2-(5-methylpyridyl)]-ethylthiomercuric acetate.
4. 2-[2-(5-ethylpyridyl)]ethylthiomercuric acetate.
5. 2-(2-pyridyl)ethylthiomercuric propionate.
6. 2-[2-(5-methylpyridyl)]ethylthiomercuric propionate.
7. A method for the preparation of a pyridylethylthiomercuric salt characterized by the following structural formula

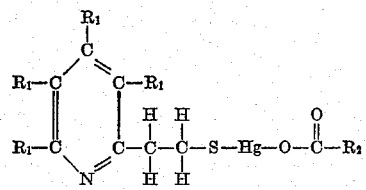

wherein: each $R_1$ is selected from the group consisting of a hydrogen atom, a methyl radical, an ethyl radical, a propyl radical and an isopropyl radical; and $R_2$ is selected from the group consisting of —$CH_3$, —$C_2H_5$ and

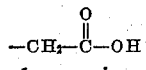

radicals; which method comprises reacting a 2-mercaptoethylpyridine with a mercuric salt of an aliphatic carboxylic acid containing not more than three carbon atoms.

8. The method of claim 7 wherein said reaction is carried out in the presence of a suitable organic solvent.

9. The method of claim 7 wherein: said 2-mercaptoethylpyridine is selected from the group consisting of 2-mercaptoethylpyridine and 2-mercaptoethylpyridine substituted with an alkyl radical selected from the group consisting of methyl, ethyl, propyl, and isopropyl radicals; and said mercuric salt is selected from the group consisting of mercuric acetate, mercuric formate, mercuric propionate, mercuric oxalate, and mercuric malonate.

10. The method of claim 7 wherein said pyridylethylthiomercuric salt is 2-(2-pyridyl)ethylthiomercuric acetate.

11. The method of claim 7 wherein said pyridylethylthiomercuric salt is 2-[2-(5-methylpyridyl)]-ethylthiomercuric acetate.

12. The method of claim 7 wherein said pyridylethylthiomercuric salt is 2-[2-(5-ethylpyridyl)]ethylthiomercuric acetate.

13. The method of claim 7 wherein said pyridylethylthiomercuric salt is 2-(2-pyridyl)ethylthiomercuric propionate.

14. The method of claim 7 wherein said pyridylethylthiomercuric salt is 2-[2-(5-methylpyridyl)]ethylthiomercuric propionate.

15. A method for the preparation of 2-(2-pyridyl)ethylthiomercuric acetate which comprises: preparing a solution of 2-mercaptoethylpyridine in methyl alcohol; preparing a solution of mercuric acetate in methyl alcohol; mixing said solutions; adding to said mixture a volume of water approximately equal to the volume of said mixture; heating said mixture to its boiling point; and recovering the resulting 2-(2-pyridyl)ethylthiomercuric acetate.

16. The method of claim 7 wherein said 2-mercaptoethylpyridine and said mercuric salt are reacted in substantially equimolar quantities.

17. A method for the preparation of 2-(2-pyridyl)ethylthiomercuric acetate which comprises: preparing a solution of 2-mercaptoethylpyridine in methyl alcohol; preparing a solution of mercuric acetate in methyl alcohol containing an amount of mercuric acetate which is substantially equimolar with respect to the amount of said 2-mercaptoethylpyridine in said first named solution; mixing said solutions; adding to said mixture a volume of water approximately equal to the volume of said mixture; heating said mixture to its boiling point; and recovering the resulting 2-(2-pyridyl)ethylthiomercuric acetate.

References Cited in the file of this patent

UNITED STATES PATENTS 2,544,904     Steiger et al.            Mar. 13, 1951

OTHER REFERENCES

Whitmore: Organ. Chemistry, 2nd ed., D. Van Nostrand Co., N. Y., 1951, pp. 143–146.

Fuson: Advanced Org. Chemistry, Wiley Inc., N. Y., 1950, pp. 305 and 306.

UNITED STATES PATENT OFFICE
Certificate of Correction

Patent No. 2,842,549                                                                   July 8, 1958

Lyle D. Goodhue et al.

It is hereby certified that error appears in the printed specification of the above numbered patent requiring correction and that the said Letters Patent should read as corrected below.

Column 1, line 35, for "-CH$_2$H$_5$" read — -C$_2$H$_5$—; column 2, line 33, for "2-[3,4,5-tripropylpyridyl)] ethylthio-" read —2-[2-(3,4,5-tripropylpyridyl)]ethylthio- —.

Signed and sealed this 19th day of May 1959.

[SEAL]

Attest:
KARL H. AXLINE,
*Attesting Officer.*

ROBERT C. WATSON,
                                                             *Commissioner of Patents.*